United States Patent
Lee

(10) Patent No.: US 7,887,206 B2
(45) Date of Patent: Feb. 15, 2011

(54) OPTICAL UNIT, BACKLIGHT ASSEMBLY WITH THE OPTICAL UNIT, AND DISPLAY DEVICE WITH THE BACKLIGHT ASSEMBLY

(75) Inventor: Jae Young Lee, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 495 days.

(21) Appl. No.: 11/827,331

(22) Filed: Jul. 10, 2007

(65) Prior Publication Data
US 2008/0049443 A1      Feb. 28, 2008

(30) Foreign Application Priority Data
Aug. 22, 2006   (KR) ...................... 10-2006-0079175

(51) Int. Cl.
*F21V 8/00* (2006.01)
(52) U.S. Cl. .................. 362/84; 362/608; 362/612; 362/618; 362/622
(58) Field of Classification Search ............... 362/84, 362/608, 612, 618, 622, 293
See application file for complete search history.

(56) References Cited

U.S. PATENT DOCUMENTS 6,210,012 B1 *   4/2001   Broer ................... 362/84

2006/0072315 A1 *   4/2006   Han et al. ................ 362/231

FOREIGN PATENT DOCUMENTS

| CN | 1538220 A | 10/2004 |
|---|---|---|
| CN | 1758116 A | 4/2006 |
| CN | 1782814 | 6/2006 |
| JP | 2004-117594 A | 4/2004 |
| JP | 2005-072129 | 3/2005 |
| KR | 10-2006-0070329 A | 6/2006 |
| WO | WO2005/071039 A1 | 8/2005 |

OTHER PUBLICATIONS

First Office Action issued in corresponding Chinese Patent Application No. 200710126976.3; issued Sep. 12, 2008.
Second Office Action issued in corresponding Chinese Patent Application No. 200710126976.3; issued Mar. 13, 2009.
Office Action issued in corresponding Chinese Patent Application No. 200710126976.3; issued Jul. 24, 2009.
Office Action issued in corresponding Chinese Patent Application No. 200710126976.3; issued Jan. 22, 2010.

* cited by examiner

*Primary Examiner*—Sharon E Payne
(74) *Attorney, Agent, or Firm*—Brinks Hofer Gilson & Lione

(57) ABSTRACT

An optical includes an optical body including a plurality of side faces where one of the plurality of side faces defines a light entrance face onto which a blue light is incident. A light exit face is connected to at least one of the side faces, and a yellow fluorescent layer is disposed on the light entrance face and is configured to convert the blue light into a white light.

20 Claims, 12 Drawing Sheets

OPTICAL UNIT, BACKLIGHT ASSEMBLY WITH THE OPTICAL UNIT, AND DISPLAY DEVICE WITH THE BACKLIGHT ASSEMBLY

This application claims the benefit of Korean Patent Application No. 2006-0079175 filed on Aug. 22, 2006, which is hereby incorporated by reference.

BACKGROUND

1. Field of the Invention

The present invention relates to an optical unit, a backlight assembly with the optical unit, and a display device with the backlight assembly.

2. Description of the Related Art

Various display devices for displaying images have been developed in large numbers. The display device changes data from an electrical format to a visual format. Such display devices are used in devices, such as portable telephones, MP3 players, computers, and television receivers. Typical types of displays include a liquid crystal displays, organic light emitting displays, and a plasma displays, etc.

The liquid crystal display device displays an image using a liquid crystal material having electrical characteristics that cause molecules in the liquid crystal material to align according to an electrical field applied thereto. The optical transmittance of the liquid crystal material changes in accordance with the alignment arrangement. Liquid crystal display devices include a control part for controlling the liquid crystal material and an optical part for providing light to the liquid crystal material.

The optical part includes a light guide plate (LGP), a light source for providing light to the light guide plate, and an optical sheet for enhancing optical characteristics, such as brightness and brightness uniformity. The quality of light generated by the optical part greatly affects the quality of an image generated by the control part. In particular, the optical characteristics of the light guide plate and the light source may enhance or degrade the display quality of the image generated by the control part.

SUMMARY

An optical includes an optical body including a plurality of side faces where one of the plurality of side faces defines a light entrance face onto which a blue light is incident. A light exit face is connected to at least one of the side faces, and a yellow fluorescent layer is disposed on the light entrance face and is configured to convert the blue light into a white light.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
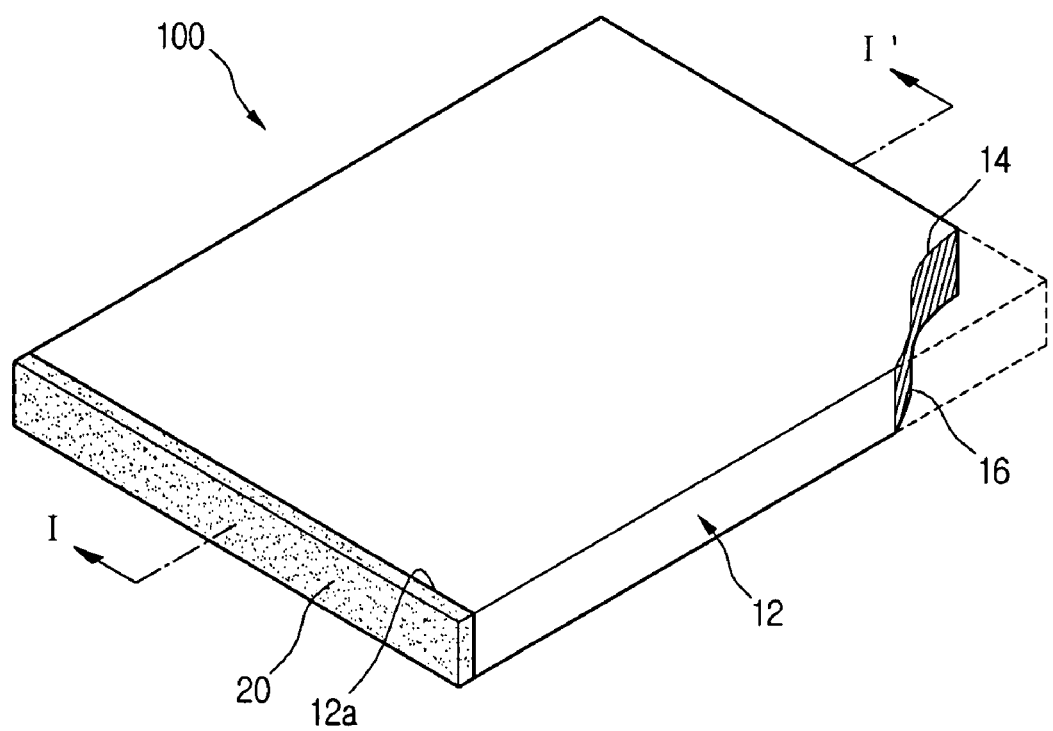
FIG. 1 is a perspective view of an optical unit according to an embodiment.
Figure 2:
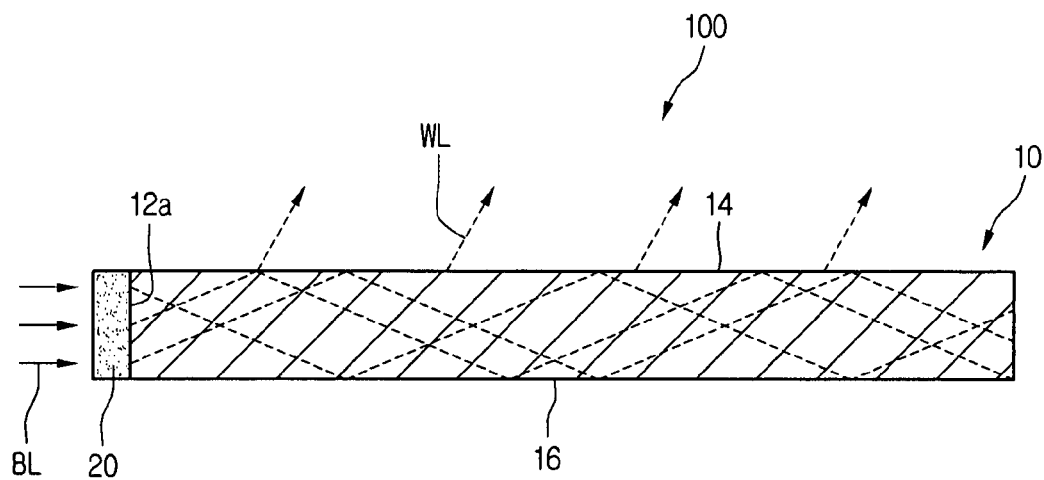
FIG. 2 is a sectional view taken along a line I-I' of FIG. 1.

FIG. 1 is a perspective view of an optical unit. FIG. 2 is a sectional view taken along a line I-I' in FIG. 1. Referring to FIGS. 1 and 2, an optical unit 100 includes an optical body 10 and a yellow fluorescent layer 20. The optical body 10, for example, has a rectangular plate shape. Examples of material that may be used as the optical body 10 include polymethylmethacryl (PMMA), etc. Since the optical body 10 has the rectangular plate shape, the optical body 10 has four side faces 12, a first face 14 connected to the four side faces 12, and a second face 16 opposite to the first face 14.

One of the four side faces 12 is defined as a light entrance face through which light enters, and one of the first face 14 and the second face 16 will be defined as a light exit face through which light exits. The light entrance face is denoted by a reference numeral 12a, and the light exit face is denoted as the first face 14.

Blue light BL is incident onto the light entrance face 12a, and white light WL exits through the light exit face 14. To this end, a yellow fluorescent layer 20 is disposed on the light entrance face 12a to convert the incident blue light BL into the white light WL. The yellow fluorescent layer 20 includes yellow fluorescent particles for converting the incident blue light BL into the white light WL and a binder for forming the yellow fluorescent particles into the shape of a layer.

The thickness of the yellow fluorescent layer 20 and the amount of the yellow fluorescent particles in the yellow fluorescent layer 20 are adjusted to be sufficient to convert the incident blue light BL into the white light WL. In addition, when the light entrance face 12a is planar, the yellow fluorescent layer 20 of a thickness measured from the light entrance face 12a may be uniform.

Figure 3:
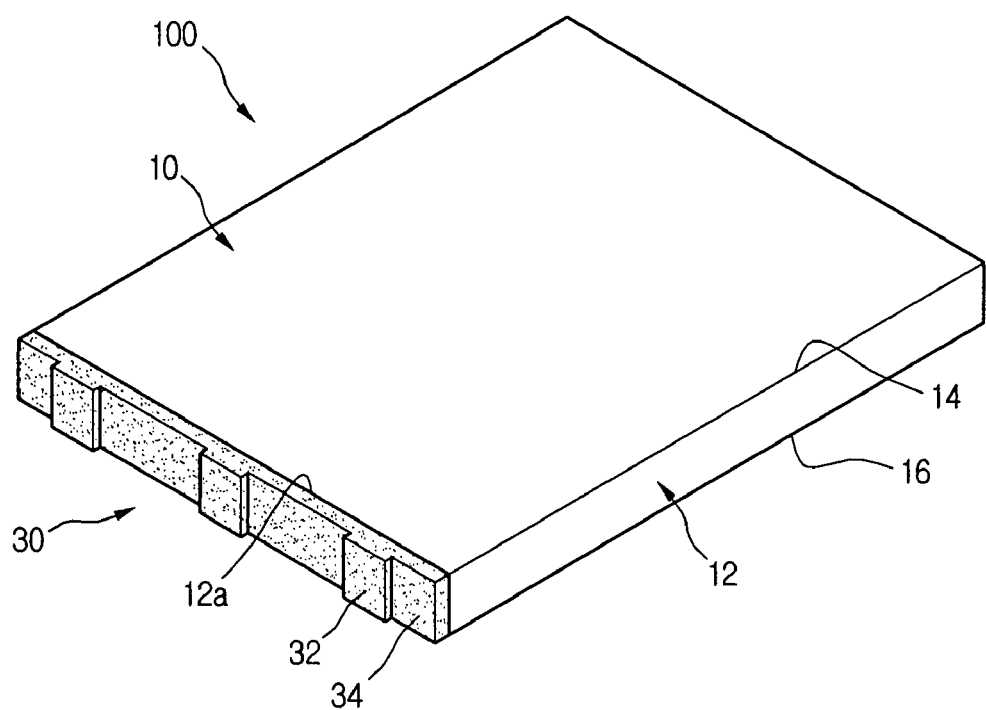
FIG. 3 is a perspective view of an optical unit according to an embodiment.

FIG. 3 is a perspective view of an optical unit having substantially the same structure as the optical unit described above with the exception of its yellow fluorescent layer. An optical unit 100 includes an optical body 10 and a yellow fluorescent layer 30 that is disposed on the light entrance face 12a. The yellow fluorescent layer 30 includes a first yellow fluorescent portion 32 and a second yellow fluorescent portion 34. The second yellow fluorescent portion 34 is formed on the entire area of the light entrance face 12a, and the first yellow fluorescent portion 32 is formed on the second yellow fluorescent portion 34. Therefore, the first yellow fluorescent portion 32 has a smaller area than the second yellow fluorescent portion 34.

When the light entrance face 12a is planar, the first yellow fluorescent portion 32 and the second yellow fluorescent portion 34 have a first thickness and a second thickness measured from the light entrance face 12a, respectively. In the second embodiment, the first thickness is larger than the second thickness. Blue light (BL) mainly enters through the first yellow fluorescent portion 32 onto the light entrance face 12a. The remaining blue light, which has failed to enter through the first yellow fluorescent portion 32, enters through the second yellow fluorescent portion 34 onto the light entrance face 12a. The yellow fluorescent layer 30 may be fabricated by forming the second yellow fluorescent portion 34 in a uniform thickness on the entire area of the light entrance face 12a and then forming the first yellow fluorescent portion 32 on a portion of the second yellow fluorescent portion 34, for example, using a silk-screen process.

Figure 4:
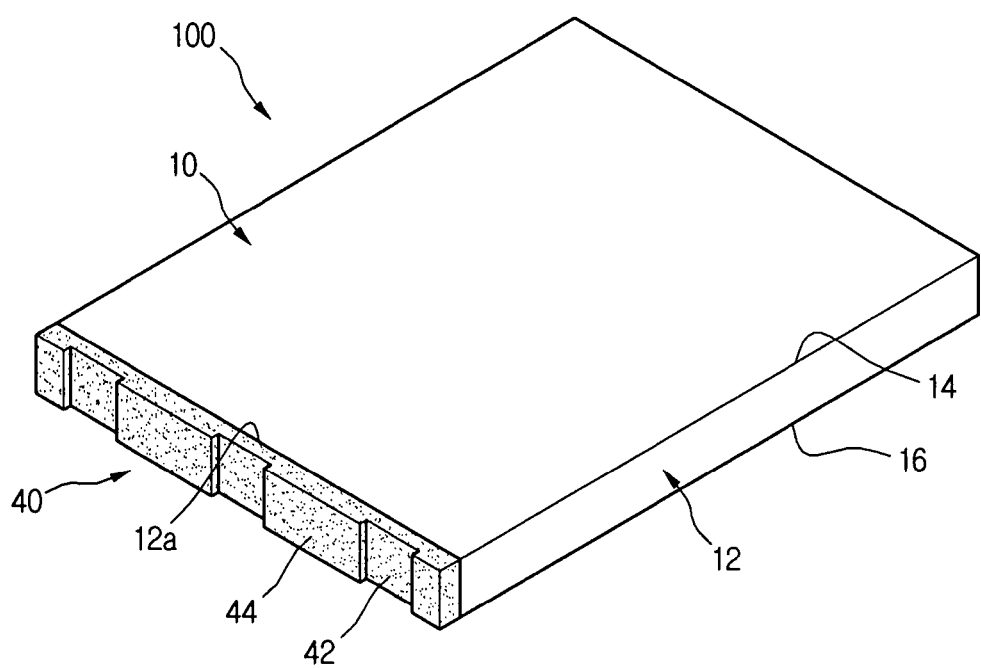
FIG. 4 is a perspective view of an optical unit according to an embodiment.

FIG. 4 is a perspective view of an optical unit having substantially the same structure as the optical unit described above with the exception of its yellow fluorescent layer. An optical unit 100 includes an optical body 10 and a yellow fluorescent layer 40. The yellow fluorescent layer 40 includes a first yellow fluorescent portion 42 and a second yellow fluorescent portion 44. The first yellow fluorescent portion 42 is formed on the entire area of the light entrance face 12a, and the second yellow fluorescent portion 44 is formed on the first yellow fluorescent portion 42. Therefore, the first yellow fluorescent portion 42 has a larger area than the second yellow fluorescent portion 44. When the light entrance face 12a is planar, the first yellow fluorescent portion 42 and the second yellow fluorescent portion 44 respectively have a first thickness and a second thickness measured from the light entrance face 12a. The first thickness is smaller than the second thickness.

Blue light mainly enters through the first yellow fluorescent portion 42 onto the light entrance face 12a. The remaining blue light, which has failed to enter through the first yellow fluorescent portion 42, enters through the second yellow fluorescent portion 44 onto the light entrance face 12a. The yellow fluorescent layer 40 may be fabricated by forming the first yellow fluorescent portion 42 in a uniform thickness on the entire area of the light entrance face 12a and then forming the second yellow fluorescent portion 44 on a portion of the first yellow fluorescent portion 42, for example, using a silk-screen process.

Figure 5:
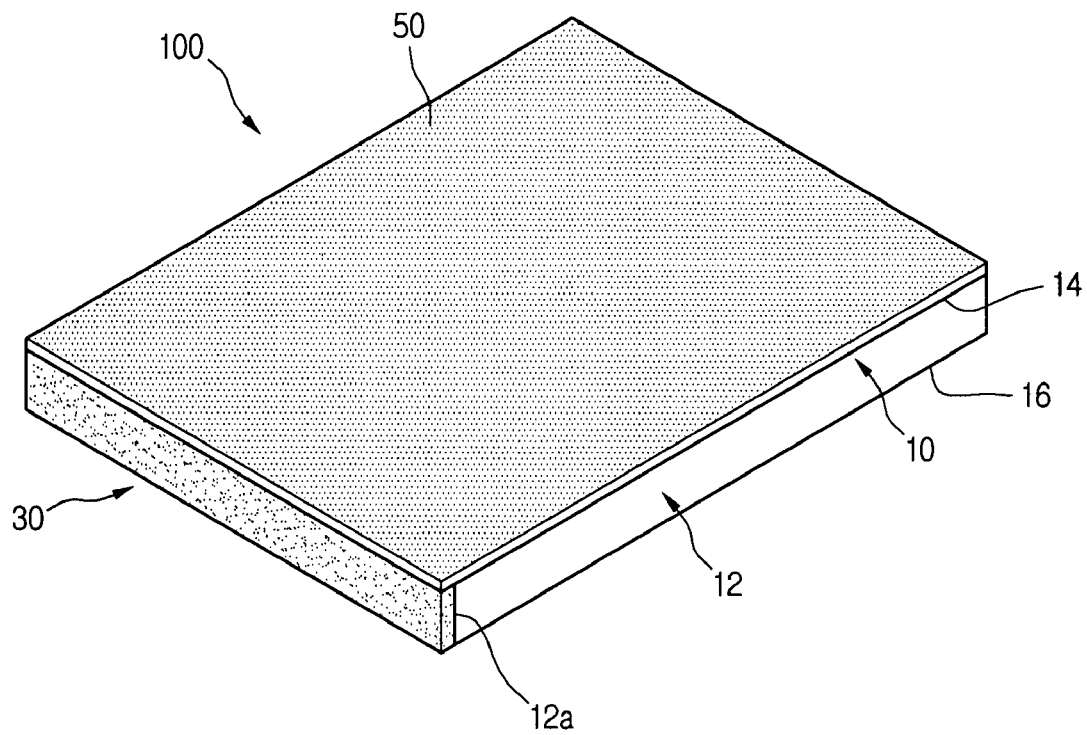
FIG. 5 is a perspective view of an optical unit according to an embodiment.

FIG. 5 is a perspective view of an optical unit having substantially the same structure as the optical unit described above with the exception that it includes an additional fluorescent layer. An optical unit 100 includes an optical body 10, a yellow fluorescent layer 30, and an additional yellow fluorescent layer 50. The yellow fluorescent layer 30 is disposed on the light entrance face 12a of the optical body 10 to primarily convert the blue light incident onto the light entrance face 12a into white light. When there is the remaining blue light that is a portion of the incident blue light onto the light entrance face 12a, which has failed to be converted into white light, a mixture of the remaining blue light and the white light exits through the light exit face 14, which may greatly degrade the image display quality.

The additional yellow fluorescent layer 50 is disposed on the light exit face 14 of the optical body 10. The additional yellow fluorescent layer 50 secondarily converts the remaining blue light, which is a portion of the incident blue light that has failed to be converted into white light by the yellow fluorescent layer 30, such that all of the incident blue light incident is converted into white light. The thickness of the additional yellow fluorescent layer 50 and/or the amount of yellow fluorescent material contained in the additional yellow fluorescent layer 50 is precisely adjusted such that pure white light exits through the light exit face 14.

Figure 6:
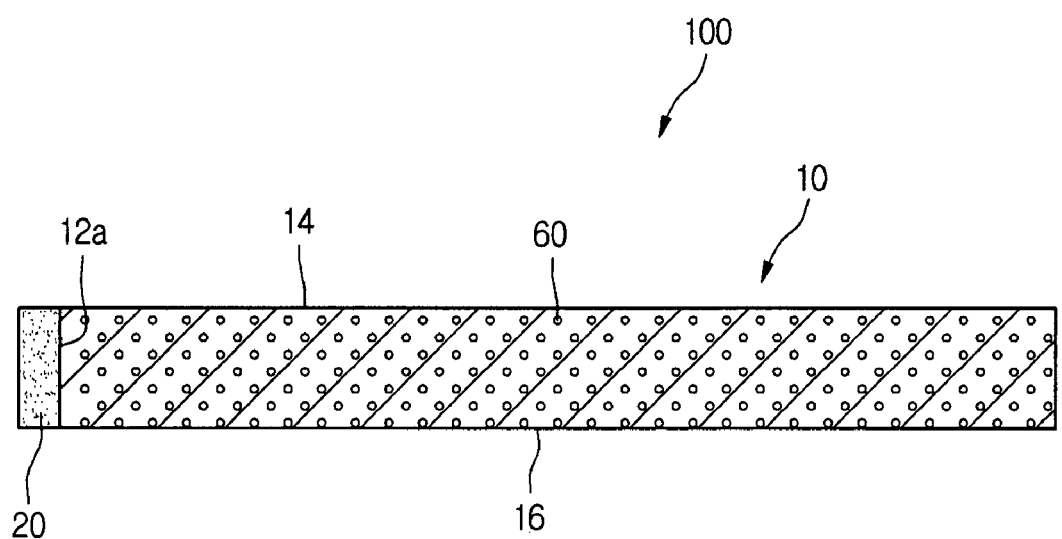
FIG. 6 is a sectional view of an optical unit according to an embodiment.

FIG. 6 is a sectional view of an optical unit having substantially the same structure as the optical unit described above with the exception that it further includes yellow fluorescent beads. An optical unit 100 includes an optical body 10, a yellow fluorescent layer 20, and yellow fluorescent beads 60. The yellow fluorescent layer 20 is disposed on the light entrance face 12a of the optical body 10 to primarily convert the blue light incident onto the light entrance face 12a into white light. The yellow fluorescent beads 60 include yellow fluorescent material and a binder enclosing the yellow fluorescent material. The yellow fluorescent beads 60 have the shape of, for example, a spherical bead. The yellow fluorescent beads 60 are distributed uniformly in the optical body 10 to secondarily convert the remaining blue light, which is a portion of the incident blue light that has failed to be converted into white light by the yellow fluorescent layer 20, into white light.

Figure 7:
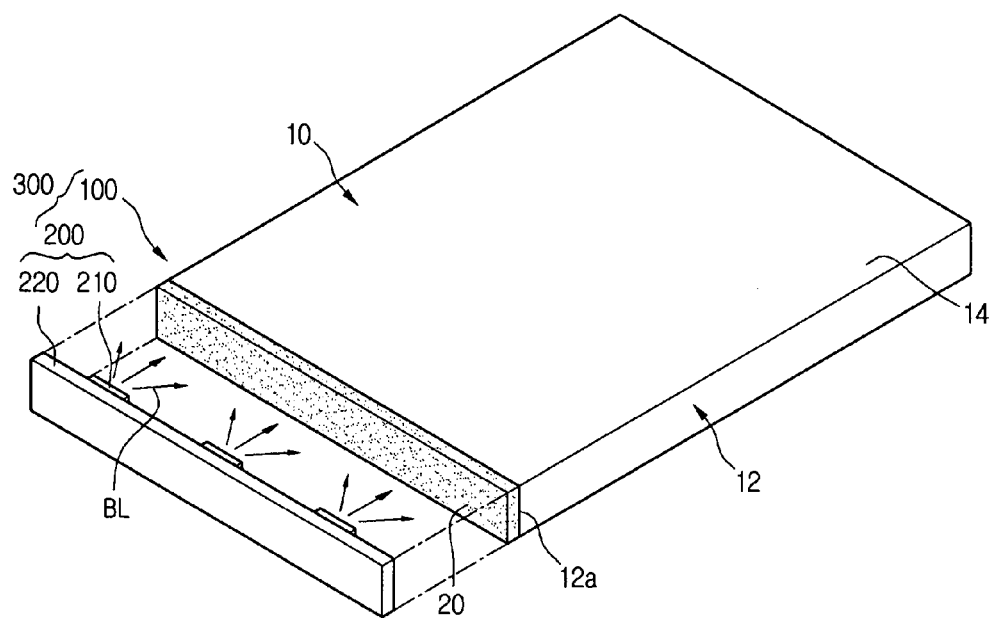
FIG. 7 is an exploded perspective view of a backlight assembly according to an embodiment.

FIG. 7 is an exploded perspective view of a backlight assembly. The backlight assembly 300 includes an optical unit 100 and a blue light generator unit 200. The optical unit 100 includes an optical body 10 and a yellow fluorescent layer 20. The optical body 10 has the shape of, for example, a cuboidal plate. The optical body 10 is formed of, for example, polymethylmethacryl (PMMA). The optical body 10 includes four side faces 12, including a light entrance face 12a and a light exit face 14 that is connected to the four side faces 12, through which white light exits.

Blue light BL is incident on the light entrance face 12a, and white light WL exits through the light exit face 14. To this end, a yellow fluorescent layer 20 is disposed on the light entrance face 12a to convert the incident blue light BL into the white light WL. The yellow fluorescent layer 20 includes yellow fluorescent particles for converting the incident blue light BL into the white light WL and a binder for forming the yellow fluorescent particles into the shape of a layer. The thickness of the yellow fluorescent layer 20 and the amount of the yellow fluorescent particles in the yellow fluorescent layer 20 are determined by the amount of the incident blue light BL.

When the light entrance face 12a is planar, the yellow fluorescent layer 20 has a uniform thickness from the light entrance face 12a. The blue light generator unit 200 is disposed such that it faces the light entrance face 12a to provide blue light BL onto the light entrance face 12a. The blue light generator unit 200 includes a light-emitting diode (LED) 210 that emits blue light BL and a circuit board 220 that supplies power to the LED 210. For example, the circuit board 220 may be a flexible circuit board. Alternatively, the blue light generator unit 200 may be a cold cathode fluorescent lamp (CCFL) that generates blue light BL. The LED 210 is mounted on the circuit board 220, and a heat sink member is preferably disposed at the circuit board 220 in order to prevent the optical characteristics of the LED 210 from being degraded by heat.

Figure 8:
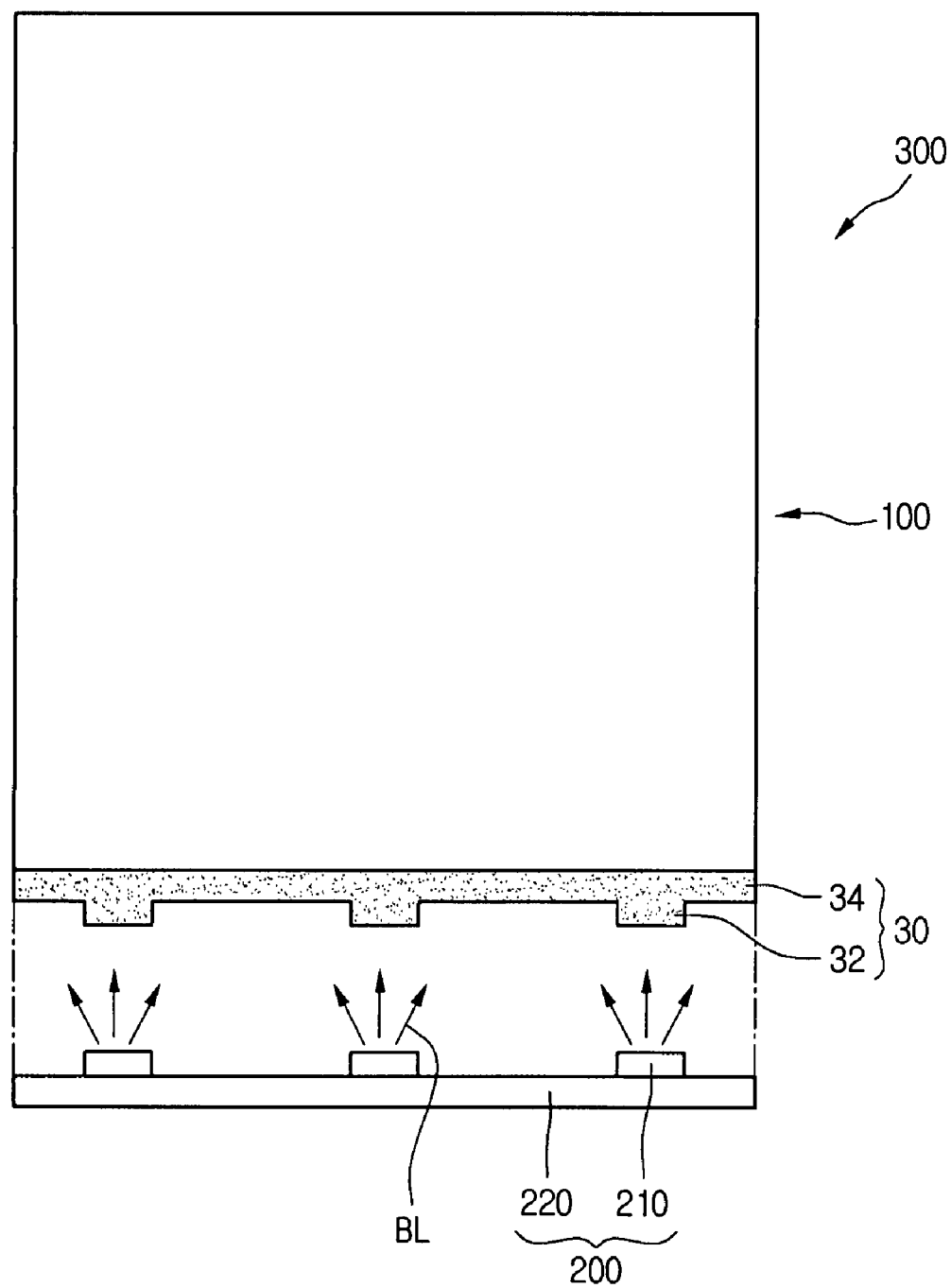
FIG. 8 is a plan view of a backlight assembly according to an embodiment.

FIG. 8 is a plan view of a backlight assembly having substantially the same structure as the backlight assembly described above with the exception of its yellow fluorescent layer. The backlight assembly 300 includes an optical unit 100, a yellow fluorescent layer 30, and a blue light generator unit 200. The yellow fluorescent layer 30 includes a first yellow fluorescent portion 32 and a second yellow fluorescent portion 34. The first yellow fluorescent portion 32 has a smaller area than the second yellow fluorescent portion 34. When the light entrance face 12a is planar, the first yellow fluorescent portion 32 and the second yellow fluorescent portion 34 respectively have a first thickness and a second thickness from the light entrance face 12a. The first thickness is larger than the second thickness. The first yellow fluorescent portion 32 and the second yellow fluorescent portion 34 are disposed such that they face an LED 210 of the blue light generator unit 200 to convert blue light BL emitted from the LED 210 into white light.

Figure 9:
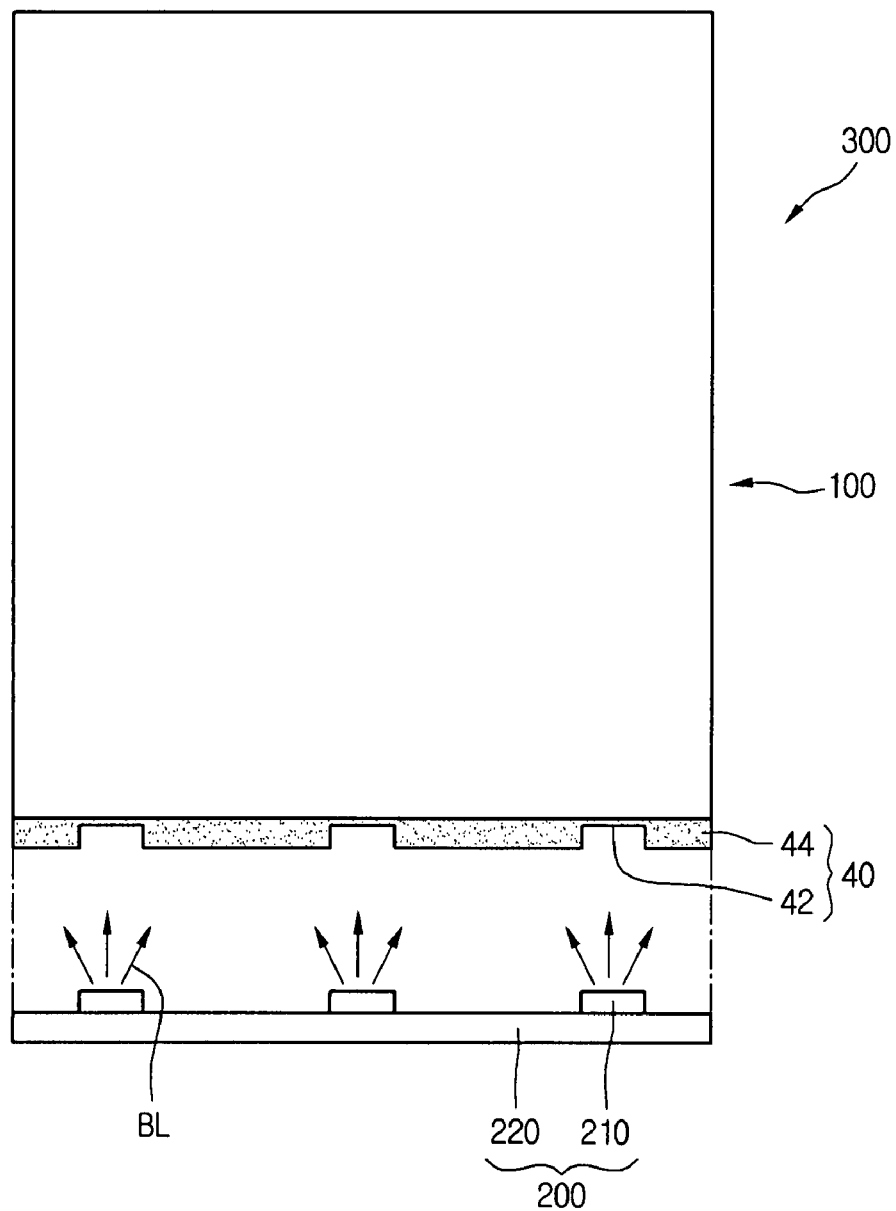
FIG. 9 is a plan view of a backlight assembly according to an embodiment.

FIG. 9 is a plan view of a backlight having has substantially the same structure as the backlight assembly described above with the exception that its yellow fluorescent layer. A backlight assembly 300 includes an optical unit 100, a yellow fluorescent layer 40, and a blue light generator unit 200. The yellow fluorescent layer 40 includes a first yellow fluorescent portion 42 and a second yellow fluorescent portion 44. The first yellow fluorescent portion 42 has a larger area than the second yellow fluorescent portion 44. When the light entrance face 12a is planar, the first yellow fluorescent portion 42 and the second yellow fluorescent portion 44 respectively have a first thickness and a second thickness from the light entrance face 12a. The first thickness is smaller than the second thickness. The blue light generator unit 200 includes an LED 210 that emits blue light BL. For example, the LED 210 of the blue light generator unit 200 may be disposed corresponding to the first yellow fluorescent portion 42.

Most of the blue light BL emitted from the LED 210 is converted into white light while entering through the first yellow fluorescent portion 42 onto the light entrance face 12a. The remaining blue light, which has failed to enter through the first yellow fluorescent portion 42, is converted into white light while entering through the second yellow fluorescent portion 44 onto the light entrance face 12a.

Figure 10:
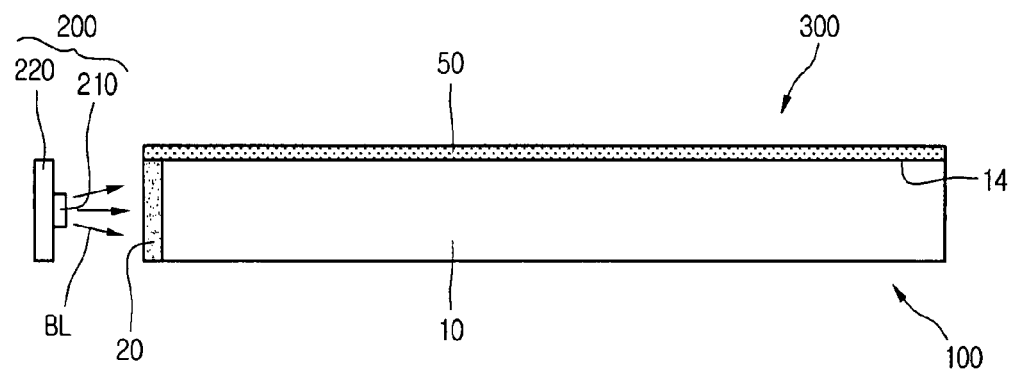
FIG. 10 is a sectional view of a backlight assembly according to an embodiment.

FIG. 10 is a sectional view of a backlight assembly having substantially the same structure as the backlight assembly described above with the exception that it includes an additional yellow fluorescent layer. A backlight assembly 300 includes an optical unit 100, a yellow fluorescent layer 20, an additional yellow fluorescent layer 50, and a blue light generator unit 200. The yellow fluorescent layer 20 is disposed on the light entrance face 12a of the optical body 10 to primarily convert the blue light BL incident onto the light entrance face 12a into white light. When there is the remaining blue light that is a portion of the incident blue light BL, which has failed to be converted into white light, a mixture of the remaining blue light and the white light exits through the light exit face 14, which may greatly degrade the image display quality.

The additional yellow fluorescent layer 50 is disposed on the light exit face 14 of the optical body 10. The additional yellow fluorescent layer 50 secondarily converts the remaining blue light, which is a portion of the incident blue light that has failed to be converted into white light by the yellow fluorescent layer 20, into white light such that all of the incident blue light is converted into pure white light. The thickness of the additional yellow fluorescent layer 50 and/or the amount of yellow fluorescent material contained in the additional yellow fluorescent layer 50 is precisely adjusted such that pure white light exits through the light exit face 14. The blue light generator unit 200 provides blue light BL to the yellow fluorescent layer 20 that is disposed on the light entrance face 12a.

Figure 11:
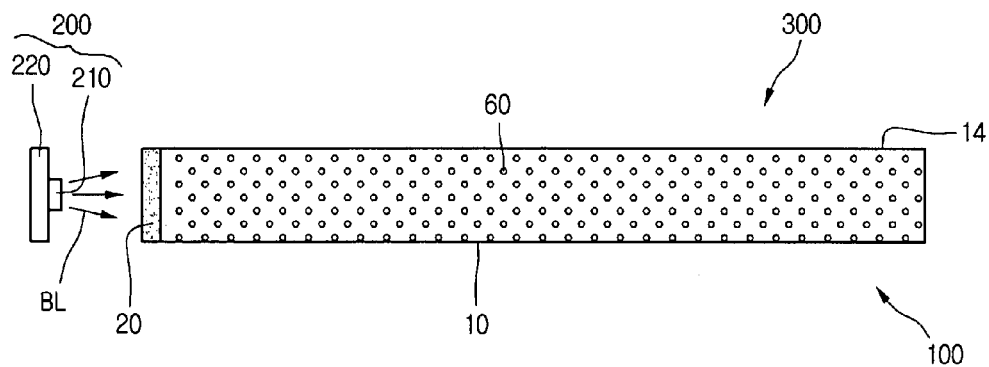
FIG. 11 is a sectional view of a backlight assembly according to an embodiment.

FIG. 11 is a sectional view of a backlight assembly having substantially the same structure as the backlight assembly described above with the exception that it further includes yellow fluorescent beads. A backlight assembly 300 includes an optical unit 100, a yellow fluorescent layer 20, yellow fluorescent beads 60, and a blue light generator unit 200. The yellow fluorescent layer 20 is disposed on the light entrance face 12a of the optical body 10 to convert most of the blue light incident onto the light entrance face 12a into white light. The yellow fluorescent beads 60 include yellow fluorescent material and a binder enclosing the yellow fluorescent material. The yellow fluorescent beads 60 have the shape of a spherical bead. The yellow fluorescent beads 60 are distributed uniformly in the optical body 10 to convert the remaining blue light, which is a portion of the incident blue light that has failed to be converted into white light by the yellow fluorescent layer 20, into white light. The blue light generator unit 200 provides blue light BL to the yellow fluorescent layer 20 that is disposed on the light entrance face 12a.

Figure 12:
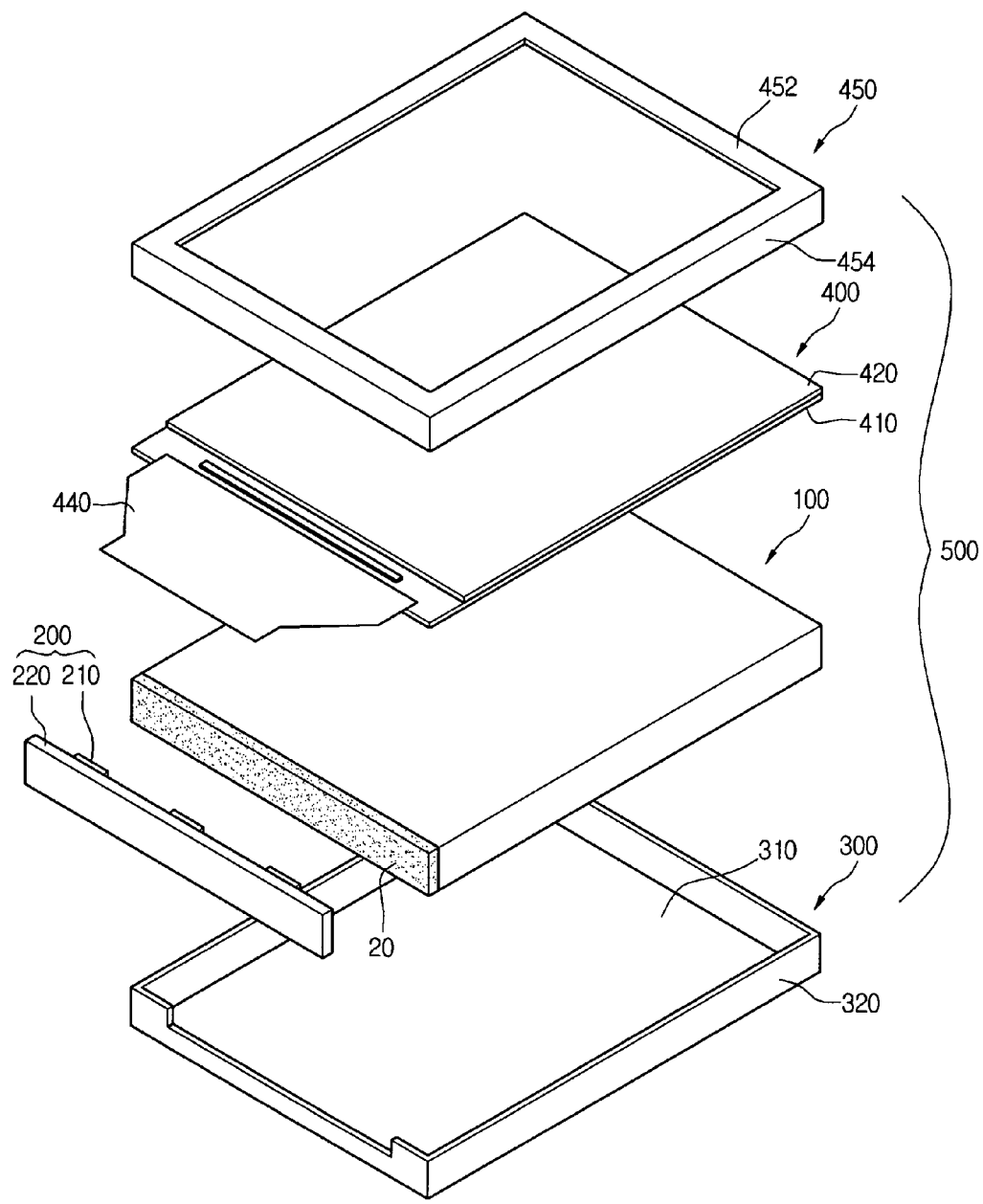
FIG. 12 is an exploded perspective view of a display device according to an embodiment.

FIG. 12 is an exploded perspective view of a display device having substantially the same as the backlight assembly described above with the exception that it further includes a display panel, a top case, and a receiving case. A display device 500 includes an optical unit 100, a receiving case 300, a display panel 400, and a top case 450. The optical unit 100 includes a yellow fluorescent layer 20 that is disposed on a light entrance face of an optical body 10 to convert incident blue light into white light. The receiving case 300 includes a bottom side 310 and a sidewall 320. The optical unit 100 is received and fixed by the receiving case 300.

A blue light generator unit 200 is disposed in the receiving case 300 to provide blue light onto the light entrance face of the optical body 10. For example, the blue light generator unit 200 includes an LED 210 that emits blue light BL and a circuit board 220 that supplies power to the LED 210. The display panel 400 is disposed on the optical unit 100. The display panel 400 includes a TFT substrate 410, a color filter substrate 420, and a liquid crystal layer (not shown). The TFT substrate 410 includes TFTs and a pixel electrode connected to each of the TFTs. The color filter substrate 420 includes a color filter and is disposed to face the TFT substrate 410. The liquid crystal layer is interposed between the TFT substrate 410 and the color filter substrate 420. A reference numeral 440 denotes a flexible circuit board that is disposed at the TFT substrate 410 to provide a driving signal to the TFT substrate 410.

The top case 450 may be optionally included in the display device 500. The top case 450 prevents the display panel 400 and the optical unit 100 from being detached from the receiving case 300. The top case 450 may include a first side 452 and a second side 454 extending from the first side 452. The first side 452 is formed in the shape of a rectangular frame covering an edge portion of the display panel 400, which is an inactive display region that does not display an image. The second side 454 extends from the first side 452 to contact the sidewall 320 of the receiving case 300.

As described above, the blue light emitted from the LED is converted into white light as it passes through the optical unit. Accordingly, it is possible to provide white light to the display panel without using expensive white light emitting LEDs.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. An optical unit comprising:
an optical body including a plurality of side faces having a light entrance face onto which a blue light is incident, and a light exit face connected to the side faces; and
a yellow fluorescent layer disposed on the light entrance face of the optical body to convert the blue light into a white light to a single layer structure,
wherein the yellow fluorescent layer includes a plurality of a first yellow fluorescent portions and a plurality of a second yellow fluorescent portions,
wherein the first yellow fluorescent portions and the second yellow fluorescent portions respectively have a first thickness and a second thickness measured from the light entrance face, the second thickness being larger than the first thickness,
wherein the first yellow fluorescent portions is disposed corresponding to an LEDs.

2. The optical unit according to claim 1, wherein the first yellow fluorescent portion has a first area and the second yellow fluorescent portion has a second area smaller than the first area.

3. The optical unit according to claim 1, further comprising an additional yellow fluorescent layer disposed on the light exit face to convert a portion of the blue light, which leaks onto the light exit face, into white light.

4. The optical unit according to claim 1, wherein the optical body further includes yellow fluorescent beads for converting a portion of the blue light, which leaks onto the light exit face, into white light.

5. The optical unit according to claim 4, wherein the yellow fluorescent beads include a yellow fluorescent material and a binder enclosing the yellow fluorescent material.

6. An optical unit comprising:
an optical body including a plurality of side faces having a light entrance face onto which a blue light is incident, and a light exit face connected to the side faces; and
a yellow fluorescent layer disposed on the light entrance face of the optical body to convert the blue light into a white light to a single layer structure,
wherein the yellow fluorescent layer includes a plurality of a first yellow fluorescent portions and a plurality of a second yellow fluorescent portions,
wherein the first yellow fluorescent portions and the second yellow fluorescent portions respectively have a first thickness and a second thickness measured from the light entrance face, the second thickness being smaller than the first thickness,
wherein the first yellow fluorescent portions is disposed corresponding to an LEDs.

7. The optical unit according to claim 6, wherein the first yellow fluorescent portion has a first area and the second yellow fluorescent portion has a second area larger than the first area.

8. The optical unit according to claim 6, further comprising an additional yellow fluorescent layer disposed on the light exit face to convert a portion of the blue light, which leaks onto the light exit face, into white light.

9. The optical unit according to claim 6, wherein the optical body further includes yellow fluorescent beads for converting a portion of the blue light, which leaks onto the light exit face, into white light.

10. The optical unit according to claim 9, wherein the yellow fluorescent beads include a yellow fluorescent material and a binder enclosing the yellow fluorescent material.

11. A display device comprising:
an optical unit including an optical body including a plurality of side faces having a light entrance face onto which a blue light is incident, and a light exit face connected to the side faces, and a yellow fluorescent layer disposed on the light entrance face of the optical body to convert the blue light into a white light to a single layer structure;
at least one blue light generator unit disposed to provide blue light to the light entrance face;
a receiving case configured to receive the optical unit and the blue light generator unit; and
a display panel disposed to face the light exit face and received in the receiving case to display an image using the white light,
wherein the yellow fluorescent layer facing the blue light generator unit includes a plurality of a first yellow fluorescent portions and a plurality of a second yellow fluorescent portions,
wherein the first yellow fluorescent portions and the second yellow fluorescent portions respectively have a first thickness and a second thickness from the light entrance face, the second thickness being larger than the first thickness,
wherein the first yellow fluorescent portions is disposed corresponding to the blue light generator unit.

12. The display device according to claim 11, further comprising an additional yellow fluorescent layer disposed on the light exit face to convert a portion of the blue light, which leaks onto the light exit face, into white light.

13. The display device according to claim 11, wherein the optical body further includes yellow fluorescent beads for converting a portion of the blue light, which leaks onto the light exit face, into white light.

14. The display device according to claim 13, wherein the yellow fluorescent beads include a yellow fluorescent material and a binder enclosing the yellow fluorescent material.

15. The display device according to claim 11, wherein the first yellow fluorescent portion has a smaller area than the second yellow fluorescent portion.

16. A display device comprising:
an optical unit including an optical body including a plurality of side faces having a light entrance face onto which a blue light is incident, and a light exit face connected to the side faces, and a yellow fluorescent layer disposed on the light entrance face of the optical body to convert the blue light into a white light to a single layer structure;
at least one blue light generator unit disposed to provide blue light to the light entrance face;
a receiving case configured to receive the optical unit and the blue light generator unit; and
a display panel disposed to face the light exit face and received in the receiving case to display an image using the white light,
wherein the yellow fluorescent layer facing the blue light generator unit includes a plurality of a first yellow fluorescent portions and a plurality of a second yellow fluorescent portions,
wherein the first yellow fluorescent portions and the second yellow fluorescent portions respectively have a first thickness and a second thickness from the light entrance face, the second thickness being smaller than the first thickness,
wherein the first yellow fluorescent portions is disposed corresponding to the blue light generator unit.

17. The display device according to claim 16, wherein the first yellow fluorescent portion has a larger area than the second yellow fluorescent portion.

18. The display device according to claim 16, further comprising an additional yellow fluorescent layer disposed on the light exit face to convert a portion of the blue light, which leaks onto the light exit face, into white light.

19. The display device according to claim 16, wherein the optical body further includes yellow fluorescent beads for converting a portion of the blue light, which leaks onto the light exit face, into white light.

20. The display device according to claim 19, wherein the yellow fluorescent beads include a yellow fluorescent material and a binder enclosing the yellow fluorescent material.

* * * * *

UNITED STATES PATENT AND TRADEMARK OFFICE
CERTIFICATE OF CORRECTION

PATENT NO. : 7,887,206 B2  
APPLICATION NO. : 11/827331  
DATED : February 15, 2011  
INVENTOR(S) : Jae Young Lee Page 1 of 1

It is certified that error appears in the above-identified patent and that said Letters Patent is hereby corrected as shown below:

In the Claims

In column 6, claim 1, line 64, before "first yellow fluorescent" delete "a".
In column 6, claim 1, line 64, after "and a plurality of" delete "a".
In column 7, claim 6, line 29, after "portions and a plurality of" delete "a".
In column 8, claim 11, line 2, after "includes a plurality of" delete "a".
In column 8, claim 11, line 3, after "and a plurality of" delete "a".
In column 8, claim 16, line 42, after "includes a plurality of" delete "a".
In column 8, claim 16, line 43, after "and a plurality of" delete "a".

Signed and Sealed this
Seventeenth Day of May, 2011

David J. Kappos
*Director of the United States Patent and Trademark Office*